United States Patent [19]

Cook et al.

[11] Patent Number: 5,082,914
[45] Date of Patent: Jan. 21, 1992

[54] GRAFTED CELLULOSE ESTERS CONTAINING A SILICON MOIETY

[75] Inventors: Phillip M. Cook; Stephen S. Kelley, both of Kingsport, Tenn.

[73] Assignee: Eastman Kodak Company, Rochester, N.Y.

[21] Appl. No.: 450,961

[22] Filed: Dec. 15, 1989

[51] Int. Cl.$^5$ .......... C08G 81/00; C08L 1/10; B32B 9/06; B32B 21/00
[52] U.S. Cl. .................... 527/300; 524/35; 524/37; 428/411.1; 428/438; 428/464; 428/481; 428/534; 428/535
[58] Field of Search ............ 527/300; 524/35, 37; 428/411.1, 438, 464, 481, 534, 535

[56] References Cited

U.S. PATENT DOCUMENTS

| | | | |
|---|---|---|---|
| 3,615,450 | 10/1971 | Werber et al. | 96/35.1 |
| 3,661,744 | 5/1972 | Kehr et al. | 428/419 |
| 3,749,592 | 7/1973 | Gaske et al. | 427/36 |
| 4,078,118 | 3/1978 | Moyer et al. | 428/521 |
| 4,122,181 | 9/1978 | Baird. Jr. et al. | 428/336 |
| 4,147,603 | 4/1979 | Pacifici et al. | 522/33 |
| 4,404,347 | 9/1983 | Nakamura et al. | 527/300 |
| 4,490,516 | 12/1984 | Verbanac | 527/312 |
| 4,565,857 | 1/1986 | Grant | 527/301 |
| 4,839,230 | 6/1989 | Cook | 428/423 |

Primary Examiner—Nathan M. Nutter
Assistant Examiner—Jeffrey C. Mullis
Attorney, Agent, or Firm—Thomas R. Savitsky; Betty J. Deaton; William P. Heath, Jr.

[57] ABSTRACT

The invention describes the preparation and use of cellulose esters grafted with silicon-containing thiol pendent groups which can serve as crosslinking agents during free radical polymerization of ethylenically unsaturated materials. The grafted cellulose esters provide a crosslinked polymeric network with enhanced solvent resistance and hardness properties when used in conjunction with ethylenically unsaturated materials.

35 Claims, No Drawings

GRAFTED CELLULOSE ESTERS CONTAINING A SILICON MOIETY

FIELD OF INVENTION

This invention relates to cellulose esters with pendent silicon moieties containing thiol groups that can function as chain transfer agents in free radical polymerization processes and react with ethylenically unsaturated materials to form a crosslinked polymeric network with enhanced solvent resistance and hardness properties.

BACKGROUND OF THE INVENTION

Protective coatings can be either thermoplastic or thermoset. Each type has its own set of advantages and disadvantages. This invention serves to combine the characteristics of both thermoplastic and thermoset coatings so that the advantages of each can be obtained. For example, cellulose ester lacquers are used extensively as coatings for a variety of substrates because they offer good solvent compatibility, are easily applied, sanded and buffed, have good gap-filling properties, low toxicity, good substrate wetting, and numerous other advantages. However, solvent resistance and surface hardness of such coatings are usually poor. Thermoset coatings, on the other hand, offer good hardness and solvent resistance, but they can be difficult to apply or handle and rely on thermal or moisture-type crosslinking mechanisms. Many substrates cannot tolerate high cure temperatures required for the thermal process and moisture-activated systems often have long cure times and humidity requirements.

Photo-activated polymerization of cellulose esters containing ethylenically unsaturated pendent groups has been used to combine the advantages of a thermoplastic lacquer and those of a crosslinked thermoset system. A lacquer coating is applied to a substrate in a solvent solution or by any number of coating processes well-known in the art. At this stage, the lacquer is still thermoplastic. The coating can be repaired or even removed with solvent. On exposure to actinic radiation and in the presence of a photoinitiator, the coating is transformed into a crosslinked polymeric network having enhanced hardness and solvent resistance properties.

Prior art, which teaches such technology, may be found in the U.S. Pat. Nos. 3,749,592, 4,147,603, 4,112,181, 4,404,347, 4,490,516, 4,565,857, and 4,839,230. The cellulose esters described in these patents specifically rely on ethylenically unsaturated polymerizable pendent groups to bond the cellulose ester chains together and/or to co-monomers or oligomers/prepolymers to provide some degree of enhanced coating properties relating to hardness, abrasion resistance, or solvent resistance. The main deficiency of this approach is premature polymerization leading to gelation and contributing to a decreased shelf life requiring stabilization of the cellulose ester by incorporation of free radical inhibitors. These inhibitors also interfere with subsequent photo-initiated polymerization and require increased photo-initiator concentration to overcome their inhibiting effect. Also, polymerization of the acrylate and methacrylate pendent groups described in the above art is inhibited by oxygen and often requires the use of an inert atmosphere such as nitrogen or other inert gas.

An additional deficiency of the prior art involves limited curing and the efficiency of the process. Curing of high molecular weight polymer chains containing ethylenic unsaturation occurs by diffusion of the ethylenic group to the growing chain-end. As the molecular weight of the polymer increases, the diffusion rate decreases and not all the reactive sites are used.

Besides the deficiencies in the above art, individual deficiencies are apparent also. For example, as taught by U.S. Pat. Nos. 4,112,181, 3,749,592, 4,147,603, and 4,490,516, cured films of these cross-linkable cellulose esters never reach adequate levels of solvent resistance and hardness indicative of an incompletely cured network. The photopolymerizable cellulose esters described in U.S. Pat. No. 4,565,857 are uneconomical by requiring reaction of the isocyanate with nearly 100% of available hydroxyl groups. This is required to achieve adequate levels of cure.

Other prior art is described in U.S. Pat. Nos. 3,661,744 and 4,078,118. These describe liquid compositions of polyene and polythiol components that polymerize under UV-curing conditions to give solid film. These do not describe the use of silicon-containing cellulose ester-based thiols. The compositions disclosed in these patents are not polymerized in the solid state as dry films but rather as liquid compositions.

An objective of the present invention seeks to provide cellulose esters with pendent thiol groups which can function as chain-transfer/crosslinking agents useful in coating applications based on free radical polymerization reactions. When acting as chain transfer sites, the pendent thiol groups initiate polymerization. Thus, the thiol groups are not subject to diffusion limitations at a high degree of cure and are effective at developing a fully cured network.

SUMMARY OF THE INVENTION

The present invention is directed to a grafted cellulose ester of the formula

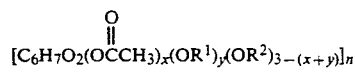

wherein
$R^1$ is a silicon moiety of the formula

$R^2$ is, independently, —H, —COCH$_3$, —COC$_2$H$_5$, or —COC$_3$H$_7$, $R^3$ is a straight chain or branched alkyl moiety of 2 to 20 carbon atoms substituted with at least one thiol group, $R^4$ is a straight chain or branched alkyl moiety of 1 to 20 carbon atoms optionally substituted with at least one thiol group, or a straight chain or branched alkoxy moiety of 1 to 20 carbon atoms, $R^5$, independently, has the same meaning as $R^4$, x is about 0.1 to 2.9, y is about 0.1 to 2.0, and n is at least 30, preferably n is 30 to 250, provided that (x+y) is in the range of 0.2 to 3.0.

The present invention is also directed to a coating composition comprising:

(a) about 1 to 90 weight percent (based on the weight of (a) plus (b)) of the grafted cellulose ester of the invention, (b) about 10 to 99 weight percent (based on the weight of (a) plus (b)) of a monomer, oligomer, polymer or mixture thereof which contains polymerizable ethylenically unsaturated groups, and (c) a solvent or mixture of solvents in an amount sufficient to solubilize components (a) and (b).

In the coating composition it is preferred that component (a) is about 20 to 80 weight percent and that component (b) is about 20 to 80 weight percent.

The present invention also includes a process for curing the coating composition of the present invention which comprises subjecting said coating composition which further contains up to 7 weight percent of at least one initiator to heat and/or light under conditions such that the polymerizable ethylenically unsaturated groups of component (b) of the coating composition become substantially polymerized.

The present invention also includes an article comprising a substrate having coated thereon the cured coating composition of the invention.

Furthermore, the present invention is also directed to a process for preparing the grafted cellulose ester of the present invention which comprises contacting (a) an ester of cellulose and at least one saturated monocarboxylic acid having 2 to 4 carbon atoms, wherein said cellulose ester has a degree of substitution per anhydro-glucose unit of residual hydroxyl groups of about 0.1 to 2.0, and (b) a compound of the formula

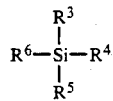

wherein $R^3$, $R^4$, and $R^5$ are defined hereinabove, and $R^6$ is halogen or straight chain or branched alkoxy moiety of 1 to 20 carbon atoms, in the presence of a solvent and a catalytic amount of a catalyst and under conditions such that the desired product is formed.

Finally, the present invention is directed to a process for facilitating isolating the grafted cellulose ester of the present invention wherein said grafted cellulose ester is in unprecipitated form and is in a mixture with reaction by-products and a solvent, comprising contacting said mixture with an amount of nonsolvent sufficient to precipitate the desired product.

DETAILED DESCRIPTION OF THE INVENTION

The cellulose ester starting materials for preparing the grafted cellulose esters of this invention are either commercially available or can be made by techniques known in the art, for example, as taught in Kirk-Othmer, *Encyclopedia of Chemical Technology*, 3rd Edition, Vol. 5, Wiley-Interscience, New York (1979), pp. 120-126.

The cellulose esters that are useful as starting materials for preparing the grafted cellulose esters of this invention are, for example, cellulose acetate, cellulose acetate propionate, and cellulose acetate butyrate. Many of such cellulose esters are commercially available and include, but are not limited to, the following: CAB-553, CAB-551, CAB-531, CAB-381, CAP-504, CAP-482, and CA-398, all commercially available from Eastman Chemical Products, Inc., Kingsport, Tenn., U.S.A. The useful degree of substitution (DS) per anhydroglucose unit (AGU) of residual hydroxyl groups of the cellulose ester component is between 0.1-2.0, with 0.2 to 0.9 being the most preferred range.

Such cellulose ester starting materials typically have a number average molecular weight of between about 10,000 and about 75,000.

The silicon-containing thiol component which is grafted onto the cellulose ester is either commercially available (e.g., from Aldrich Chemical Company) or can be prepared by procedures known in the art. Preferred silicon-containing thiol compounds include (3-mercaptopropyl)trimethoxysilane, (3-mercaptopropyl)-dimethyl-methoxysilane, (3-mercaptopropyl)dimethoxymethylsilane, (3-mercaptopropyl)dimethylchlorosilane, (3-mercaptopropyl)dimethylethoxysilane, (3-mercaptopropyl)diethoxy-methylsilane, or (3-mercaptopropyl)triethoxysilane. Accordingly, preferred $R^1$ moieties include (3-mercaptopropyl)dimethoxysilyl, (3-mercaptopropyl)-dimethylsilyl, (3-mercaptopropyl)methoxymethylsilyl, (3-mercaptopropyl)ethoxymethylsilyl, and (3-mercapto-propyl)diethoxysilyl. In the grafted cellulose ester of the present invention x is about 0.1 to 2.9 and y is about 0.1 to 2.0, preferred is when x is about 0.1 to 0.3 and y is about 0.2 to 1.0, more preferred is when x is about 0.1 and y is about 1.0. Also it is preferred that $R^3$ is a straight chain or branched alkyl moiety of 2 to 4 carbon atoms substituted with 1 to 2 thiol groups, and each of $R^4$ and $R^5$ is, independently, a straight chain or branched alkyl moiety of 1 to 4 carbon atoms optionally substituted with 1 to 2 thiol groups, or a straight chain or branched alkoxy group of 1 to 20 carbon atoms.

It is more preferred that $R^3$ is substituted with one thiol group and each of $R^4$ and $R^5$ is not substituted with a thiol group.

In the grafting process of the present invention the degree of reaction between the silicon-containing thiol moiety and the residual hydroxyls of the cellulose ester must be such that about 25-100% of the hydroxyls react. The percentage by weight of the silicon-containing moiety incorporated into the cellulose ester is about 10-50% based on the weight of the grafted cellulose ester.

The molar proportions of starting materials used in the grafting process of the present invention are those proportions sufficient to result in the desired degree of substitution of the cellulose ester to achieve the desired product.

Suitable solvents for the grafting reaction of the present invention include ketones, esters, ethers, and chlorinated hydrocarbons. They should be substantially water-free with a water content of 0.10% or less, and preferably less than 0.05% by weight. Examples include, but are not limited to, acetone, 2-butanone, 2-pentanone, ethyl acetate, propyl acetate, propyl ether, tetrahydrofuran, methylene chloride, chlorobenzene, and dichlorobenzene. Reactions are typically carried out in 10-35% solutions based on the weight of the cellulose ester at temperatures varying from about 25° C. to about 175° C. depending on the silicon-containing moiety, solvent and catalyst used.

Suitable catalysts for the grafting reaction of the present invention include but are not limited to Lewis acid types such as dialkyltin diesters, tetraalkoxy titanates, and dialkylzinc compounds. The catalyst concentrations used are typically between 0.1 and 1% based on the weight of the cellulose ester. If an organosilicon halide is used, at least an equivalent amount of proton acceptor must be present. Such proton acceptors may be, but are not limited to, tertiary organic amines such as triethylamine, pyridine, and the like or an alkali metal salt of a weak acid like sodium or potassium carbonate, sodium or potassium acetate, and the like.

The reaction mixture containing the grafted cellulose ester product may be used "as is" in coating applications or a nonsolvent can be added to the reaction mixture to precipitate the product. In the process of the invention for facilitating isolation of the grafted cellulose ester, the nonsolvent is liquid in which the grafted cellulose ester is not soluble. Suitable nonsolvents include hexane, heptane, ligroin, diisobutylketone, and isopropyl alcohol depending on the type of cellulose ester, the organosilicon moiety, and the reaction solvent. The amount of nonsolvent used in such process is that amount sufficient to precipitate the grafted cellulose ester; typically this amount is about 25 to about 75 weight percent of nonsolvent based on the total weight of the mixture. It is preferred that such process includes the additional step of separating the precipitated grafted cellulose ester from unprecipitated reaction by-products. Unprecipitated by-products typically include alcohols such as methanol or ethanol, alkali metal halides or tertiary amine hydrochlorides, and small amounts of oligomerized silicon-containing thiols by reaction with water. Solvent-free product can be obtained by filtration and drying in a forced-air or vacuum oven at 25°-100° C.

In the coating composition of the present invention the suitable solvent must be one in which the grafted cellulose ester is soluble, therefore water and most aliphatic hydrocarbons are not suitable for this purpose. Usually the same solvents suitable for the grafting reaction are also suitable for use in the coating composition. Typical examples of such solvents include, but are not limited to, ketones, esters, aromatic hydrocarbons, and chlorinated hydrocarbons. Specific examples include, but are not limited to, acetone, 2-butanone, 2-pentanone, ethyl acetate, propyl acetate, butyl acetate, chlorobenzene, and toluene.

The amount of suitable solvent in the coating composition of the present invention is that amount sufficient to solubilize the grafted cellulose ester. Typically, this amount is about 60 to about 90 weight percent of total coating composition, preferably about 65 to about 75 weight percent. It is contemplated that mixtures of solvents can be used in the coatings (and processes) of the present invention.

The coating compositions of the present invention optionally contain an initiator. The amount of initiator is up to 7 weight percent, more typically about 2 to about 7 weight percent based on the weight of the non-volatile content of the coating composition; preferably the amount of initiator is about 3 to about 5 weight percent. The initiator is either a photo-initiator or a thermal-initiator. Suitable photoinitiators include acetophenone/ and benzophenone/tertiary amine combinations, organic peroxides, benzoin and its ethers, benzil and benzil ketals. A typical photoinitiator is Irgacure ® 651, available from Ciba-Geigy. Suitable radiation for photoinitiated free-radical polymerizations can be in, for example, the ultraviolet and visible regions of the spectrum that can be produced by mercury vapor or Xenon lamps. For thermally-cured processes, suitable initiators include but are not limited to hydrogen peroxide/ferrous ion, alkyl peroxides such as lauryl or cumyl peroxides, acyl peroxides such as acetyl or benzoyl peroxide, diazonium compounds such as azobisisobutyronitrile, or an alkyl hydroperoxide.

To prepare the coated article of the present invention, the cellulose ester of the present invention is applied to a substrate and then is cured (i.e., polymerized and crosslinked) in the presence of an initiator by an amount of light or heat sufficient to effect the desired degree of curing. The substrate can be wood; plastic; metal such as aluminum or steel; cardboard; glass; cellulose esters such as cellulose acetate butyrate sheeting; various blends containing, for example, polypropylene, polypropylene and glass, polycarbonate, and various polyesters such as polyethylene terephthalate; as well as other solid substrates.

The curing of the coating compositions containing grafted cellulose esters of the present invention can be carried out in the liquid or solid state (i.e., as a dry film). Curing of the coating compositions can be carried out in the presence of an inert atmosphere such as nitrogen or other inert gas; however, it is an advantage of the present invention that use of such an inert atmosphere is not required.

Typical reaction temperatures used to practice thermal curing of the invention are about 50° to 175° C. Typical polymerization (curing) times for thermal curing are about 0.5 to 8 hours.

When ultraviolet curing is desired, depending upon the thickness of the coating (film), product formulation, photoinitiator type, radiation flux, and source of radiation, exposure times to ultraviolet radiation of about 0.5 to 10 seconds are typically required for curing.

The coating composition may optionally contain other formulation additives which contribute to the non-volatile content of the composition. Such additives include, for example, leveling agents, antifoamers, and the like. Such additives may be present in an amount of from about 0.1 to 5 weight percent of total coating composition, preferably about 0.1 to about 1.0 weight percent.

The coating composition may also optionally contain unreacted starting materials or derivatives thereof used to prepare the desired grafted cellulose ester.

In the coating composition of the present invention, component (b) is a monomer, oligomer, polymer or mixture thereof which contains polymerizable ethylenically unsaturated groups. A given compound of component (b) may have one, two or more ethylenically unsaturated groups. Suitable oligomers or polymers which can be utilized as component (b) include acrylated epoxies (such as Photomer 3000 by Henkel Corp.), acrylated polyesters (such as Ebecryl 810 by Radcure Specialties), and acrylated urethanes (such as Ebecryl 220 by Radcure Specialties). Suitable monomers which can be used as component (b) include (meth)acrylic acids and their esters such as ethyl acrylate, ethyl methacrylate, isobornyl acrylate, trimethylolpropane triacrylate, diethyleneglycol diacrylate; (meth)-acrylamides such as N-methylolacrylamide, N-(isobutoxy-methyl)acrylamide and MAGME acrylamides by American Cyanamid; styrene and substituted styrenes such as para-chlorostyrene and para-styrene sulfonic acid; vinyl esters such as vinyl acetate and vinyl butyrate; acrylonitrile; and N-vinylpyrrolidone. Of course, polymers and oligomers of the above-described monomers also can be used as component (b).

The coating on the coated article of the present invention typically has an enhanced solvent resistance. This can be determined by measuring the % acetone insoluble content of a cured coating. Such a cured coating typically has a % acetone insolubles content greater than a control coating using the same cellulose ester except that it is not grafted. It is preferred that said coating has a % acetone insolubles content of at least about 80%. Such coating also typically has a pencil hardness of greater than or equal to 2H using ASTM Procedure D-3363. The % acetone insoluble content can be determined according to the procedure described in Example 8 hereof.

The following examples are to illustrate the invention but should not be construed as a limitation thereon. The examples provided below describe the invention, use of the products in formulated coatings, photo-initiated curing of the coatings by exposure to radiation from a mercury vapor lamp and in the presence of a photoinitiator, and evaluation of the coatings before and after cure. All percentages are by weight unless indicated otherwise.

Abbreviations used in the following examples and evaluations are given below:
CA   Cellulose Acetate
CAP  Cellulose Acetate Propionate
CAB  Cellulose Acetate Butyrate
MPTMS  (2-Mercaptopropyl)Trimethoxysilane
DEGDA  Diethyleneglycol Diacrylate
EB   Ebecryl (trademark of acrylated urethane resin by Radcure Specialties)

EXAMPLE 1

To a clean and dry nitrogen-inerted flask equipped with a condenser, stirrer, heating mantle, and thermometer are charged with 800 grams of propyl acetate solvent and 100 grams of CAB-381-0.1 (1.5% hydroxyl, 15% acetyl, 39% butyryl) commercially available from Eastman Chemical Products, Inc., Kingsport, Tenn., U.S.A. The contents of the flask are heated to reflux whereupon approximately 250 grams of solvent is distilled out to azeotropically dry the cellulose ester. The flask contents are cooled to 40° C. and the following are added: 1.0 gram of dibutyltin dilaurate and 17 grams of (3-mercaptopropyl)trimethoxysilane commercially available from Aldrich Chemical Company. The flask is equipped with a short-path distillation head and the batch is heated to just below reflux (95°–100° C.) and held for six hours. The non-volatile content of the flask is adjusted to 20% by addition of more solvent.

EXAMPLE 2

To the same equipment used in Example 1 are added 800 grams of propyl acetate solvent and 100 grams of CAP-482-0.5 (2.5% hydroxyl, 3% acetyl, 45% propionyl) commercially available from Eastman Chemical Products, Inc. The cellulose ester is azeotropically dried by distilling out about 250 grams of solvent. The batch is cooled to 40° C. and the following are added to the flask: 1.0 gram of dibutyltin dilaurate and 18 grams of (3-mercaptopropyl)trimethoxysilane commercially available from Aldrich Chemical Company. The condenser is replaced with a short-path distilling head. The batch is heated to just below reflux (95°–100° C.) and held for six hours. The non-volatile content of the batch is adjusted to 20% by distilling out more solvent.

EXAMPLE 3

In a similar manner as Example 2, CAB-320-0.1 (1.5% hydroxyl, 19% acetyl, 33% butyryl) is grafted with (3-mercaptopropyl)trimethoxysilane using propyl acetate as solvent.

EXAMPLE 4

In a similar manner as Example 2, CA-398-3 (1.2% hydroxyl, 40% acetyl) is grafted with (3-mercaptopropyl)trimethoxysilane in methylene chloride solvent.

EXAMPLE 5

To the same equipment used for Example 1 are added 800 grams of propyl acetate solvent and 100 grams of CAP-504-0.2 (5.0% hydroxyl, 1% acetyl, 39% propionyl). The cellulose ester is azeotropically dried by distilling out about 250 grams of solvent. The batch is cooled to 40° C. and the following are added to the flask: 1.0 gram of dibutyltin dilaurate and 40 grams of (3-mercaptopropyl)dimethoxymethylsilane. The reflux condenser is replaced with a short-path distilling head. The batch is held at just below reflux (95°–100° C.) for six hours and then cooled to 20°–25° C. Using high speed agitation, the batch is added to 1.5 liters of heptane to precipitate the product. The slurry is filtered and the product is washed with aliquots of heptane. The product is dried in a forced air oven at 55°–60° C.

EXAMPLE 6

To the equipment used in previous examples are added 500 grams of dry 2-butanone and 100 grams of bone-dry CAB-553-0.4 (4.8% hydroxyl, 3% acetyl, 46% butyryl). The batch is stirred until a clear dope is obtained, after which 1.0 gram of dibutyltin dilaurate catalyst, 17 grams of dry pyridine, and 40 grams (3-mercapto-propyl)dimethylsilyl chloride are added. The batch is heated to 75°–78° C. for six hours and then cooled to 20°–25° C. Using high speed agitation 1.5 liters of isopropyl alcohol is added to the batch over a one-hour period to precipitate the product. The slurry is filtered, the product is washed well with isopropyl alcohol, and dried in a vacuum oven at 55°–60° C.

EXAMPLE 7

To the equipment described in the previous examples are added 500 grams of dry tetrahydrofuran and 100 grams of bone-dry CAP-504.02 (5.0% hydroxyl, 1% acetyl, 39% propionyl). After the ester dissolves to give a clear dope, 1.0 gram of dibutyltin diacetate and 26 grams of (3-mercaptopropyl)dimethylmethoxysilane are added. The batch is heated to 65° C. and held at this temperature for six hours. After cooling the batch to 20°–25° C., it is added to 1.5 liters of isopropyl alcohol using high speed agitation to precipitate the product. The slurry is filtered and the product is washed with isopropyl alcohol and pulled down well on the filter. The product is dried in a forced air oven at 55°–60° C.

EXAMPLE 8

To the equipment described above are added 40 grams of (3-mercaptopropyl)dimethylsilyl chloride and 500 grams of dry 2-butanone. The temperature of the batch is adjusted to 15°–20° C. and 20 grams of dry pyridine are added followed by 10.8 grams of anhydrous ethyl alcohol. The batch is heated to 60° C. and held for two hours. To this is added a solution of 75 grams of bone-dry CAP-504-0.2, 1 gram dibutyltin dilaurate, and 500 grams of dry 2-butanone over a one-hour period. The batch is heated to 75° C. and held for six hours. After cooling the batch to 20°-25° C., the product is precipitated by addition of 2 liters of isopropyl alcohol. The product is filtered, washed well with isopropyl alcohol, and dried in a forced air oven at 55°-60° C.

Formulation:

The following typical formulations show the utility of the grafted cellulose esters of the present invention:

A:
- 20 parts CAB-320-0.1 grafted with (3-mercaptopropyl)trimethoxysilane
- 20 parts EBECRYL 205 (urethane acrylate from Radcure Specialties)
- 160 parts propyl acetate
- 1.6 parts Irgacure 651 (photoinitiator from Ciba Geigy)

B:
- 20 parts CAB-553-0.4 grafted with MPTMS
- 20 parts EBECRYL 205 (urethane acrylate from Radcure Specialties)
- 160 parts propyl acetate
- 1.6 parts Irgacure 651 photoinitiator C:
- 20 parts CAP-482-0.5 grafted with MPTMS
- 20 parts diethyleneglycol diacrylate (DEGDA)
- 160 parts propyl acetate
- 1.6 parts Irgacure 651 photoinitiator D:
- 20 parts CAP-504-0.2 grafted with MPTMS
- 20 parts EBECRYL 220 (urethane acrylate)
- 160 parts propyl acetate
- 1.6 parts Irgacure 651 photoinitiator E:
- 20 parts CAP-504-0.2 grafted with (3.mercaptopropyl)dimethoxymethylsilane
- 20 parts EBECRYL 220 (urethane acrylate)
- 160 parts propyl acetate
- 1.6 parts Irgacure 651 photoinitiator F:
- 20 parts CAB-553-0.4 grafted with (3-mercaptopropyl)dimethylsilyl chloride
- 20 parts EBECRYL 205 (urethane acrylate)
- 160 parts propyl acetate
- 1.6 parts Irgacure 651 photoinitiator G:
- 20 parts CAP-504-0.2 grafted with (3-mercaptopropyl)dimethylmethoxysilane
- 20 parts EBECRYL 220 (urethane acrylate)
- 160 parts propyl acetate
- 1.6 parts Irgacure 651 photoinitiator H:
- 20 parts CAP-504-0.2 grafted with (3-mercaptopropyl)dimethylethoxysilane
- 20 parts EBECRYL 205 (urethane acrylate)
- 160 parts propyl acetate
- 1.6 parts Irgacure 651 photoinitiator Control Film Formulations Based on Non-grafted Cellulose Esters:

I:
- 20 parts CAB.320-0.1
- 20 parts EBECRYL 205
- 160 parts propyl acetate
- 1.6 parts Irgacure 651

J:
- 20 parts CAB-553-0.4
- 20 parts EBECRYL 205
- 160 parts propyl acetate
- 1.6 parts Irgacure 651

K:
- 20 parts CAP-482-0.5
- 20 parts diethyleneglycol diacrylate (DEGDA)
- 160 parts propyl acetate
- 1.6 parts Irgacure 651

L:
- 20 parts CAP-504-0.2
- 20 parts EBECRYL 220
- 160 parts propyl acetate
- 1.6 parts Irgacure 651

Coating of Substrate:

These formulations were used to coat a variety of substrates such as wood, glass, stainless steel, aluminum, and plastics. The substrate was coated with one of the above formulations using a knife blade or draw-down rod. The wet film thickness was 8–10 mil and the dry film thickness after evaporation of the solvent was 1–1.5 mil. The solvent was evaporated at ambient room temperature for 18 hours or in a 50°-55° C. forced air oven for 30 minutes to yield a clear film which before exposure to ultraviolet radiation was readily soluble in organic solvents.

Film Curing:

The dried coating was exposed to ultraviolet radiation from a 200 watt per inch medium pressure mercury vapor lamp housed in an American Ultraviolet Company instrument using a belt speed of 25 feet per minute. Two passes under the lamp were sufficient to yield a coating with maximum hardness and solvent resistance.

Coating Evaluations:

Pencil hardness (ASTM D-3363) and acetone insolubility were measured on each cured coating.

Pencil hardness testing was carried out by approved and published testing procedures.

Acetone insolubility is measured by immersing a dry, pre-weighed sample of the coating in acetone for 24 hours at 20°-25° C. The film is then removed, dried for 16 hours at 50°-55° C., and weighed. The percentage by weight of the film remaining after exposure to acetone is calculated from the data.

Data from evaluation of formulations using thiol-grafted cellulose esters of the present invention and control formulations using non-grafted cellulose esters are given below:

| Results of Evaluations | | | | |
|---|---|---|---|---|
| | Pencil Hardness | | % Acetone Insolubles | |
| Formulation | Before | After Cure | Before | After Cure |
| A | 4B | 2H | 0% | 72% |
| I (Control) | 4B | F | 0% | 44% |
| CAB-320 (Ungrafted) | 2B | 2B | 0% | 0% |
| B | 4B | 2H | 0% | 84% |
| J (Control) | 4B | H | 0% | 63% |
| CAB-553 (Ungrafted) | 2B | 2B | 0% | 0% |
| C | 4B | 2H | 0% | 94% |
| K (Control) | 4B | 2H | 0% | 75% |
| CAP-482 (Ungrafted) | HB | HB | 0% | 0% |
| D | 4B | 4H | 0% | 100% |
| L (Control) | 4B | 3H | 0% | 78% |
| CAP-504 (Ungrafted) | B | B | 0% | 0% |
| E | 4B | 3H | 0% | 88% |
| F | 4B | 3H | 0% | 81% |
| G | 4B | 3H | 0% | 95% |
| H | <4B | 2H | 0% | 86% |

We claim:

1. A grafted cellulose ester of the formula

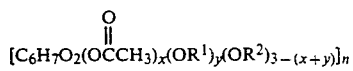

wherein

R$^1$ is a silicon moiety of the formula

R$^2$ is, independently, —H, —COCH$_3$, —COC$_2$H$_5$, or —COC$_3$H$_7$,

R$^3$ is a straight chain or branched alkyl moiety of 2 to 20 carbon atoms substituted with at least one thiol group, R$^4$ is a straight chain or branched alkyl moiety of 1 to 20 carbon atoms optionally substituted with at least one thiol group, or a straight chain or branched alkoxy moiety of 1 to 20 carbon atoms, R$^5$, independently, has the same meaning as R$^4$, x is about 0.1 to 2.9, y is about 0.1 to 2.0, and n is at least 30, provided that (x+y) is in the range of 0.2 to 3.0.

2. The cellulose ester of claim 1 wherein n is 30 to 250.

3. The cellulose ester of claim 1 wherein R$^3$ is a straight chain or branched alkyl moiety of 2 to 4 carbon atoms substituted with 1 to 2 thiol groups, and each of R$^4$ and R$^5$ is, independently, a straight chain or branched alkyl moiety of 1 to 4 carbon atoms optionally substituted with 1 to 2 thiol groups, or a straight chain or branched alkoxy group of 1 to 20 carbon atoms.

4. The cellulose ester of claim 3 wherein R$^3$ is substituted with one thiol group and each of R$^4$ and R$^5$ is not substituted with a thiol group.

5. The cellulose ester of claim 1 wherein R$^1$ is (3-mercaptopropyl)dimethoxysilyl, (3-mercaptopropyl)dimethylsilyl, (3-mercaptopropyl)methoxymethylsilyl, (3-mercaptopropyl)ethoxymethylsilyl, or (3-mercaptopropyl)diethoxysilyl.

6. The cellulose ester of claim 1 wherein the percentage by weight of the R$^1$ moiety incorporated into the cellulose ester is about 10–50%, based on the weight of the grafted cellulose ester.

7. A coating composition comprising:
(a) about 1 to 90 weight percent (based on the weight of (a) plus (b)) of a grafted cellulose ester of the formula

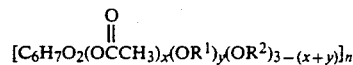

wherein

R$^1$ is a silicon moiety of the formula

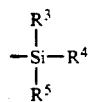

R$^2$ is, independently, —H, —COCH$_3$, —COC$_2$H$_5$, or —COC$_3$H$_7$,

R$^3$ is a straight chain or branched alkyl moiety of 2 to 20 carbon atoms substituted with at least one thiol group, R$^4$ is a straight chain or branched alkyl moiety of 1 to 20 carbon atoms optionally substituted with at least one thiol group, or a straight chain or branched alkoxy moiety of 1 to 20 carbon atoms, R$^5$, independently, has the same meaning as R$^4$, x is about 0.1 to 2.9, y is about 0.1 to 2.0, and n is at least 30, provided that (x+y) is in the range of 0.2 to 3.0, (b) about 10 to 99 weight percent (based on the weight of (a) plus (b)) of a monomer, oligomer, polymer or mixture thereof which contains polymerizable ethylenically unsaturated groups, and (c) a solvent or mixture of solvents in an amount sufficient to solubilize components (a) and (b).

8. The coating composition of claim 7 wherein the amount of component (a) is about 20 to 80 weight percent and the amount of component (b) is about 20 to 80 weight percent.

9. The coating composition of claim 7 wherein component (b) is a monomer selected from the group consisting of an acrylated epoxy, an acrylated polyester, an acrylated urethane, (meth)acrylic acid, ethyl acrylate, ethyl methacrylate, isobornyl acrylate, trimethylolpropane triacrylate, diethyleneglycol diacrylate, N-methylolacrylamide, N-(isobutoxymethyl)-acrylamide, styrene, para-chlorostyrene, para-styrene sulfonic acid, vinyl acetate, vinyl butyrate, acrylonitrile, and N-vinylpyrrolidone.

10. The coating composition of claim 7 additionally comprising up to 7 weight percent of at least one initiator, based on the weight of the non-volatile content of the composition.

11. The coating composition of claim 10 wherein said initiator is an acetophenone/tertiary amine combination, a benzophenone/tertiary amine combination, an organic peroxide, benzoin, an ether of benzoin, a benzil ether, a hydrogen peroxide/ferrous ion combination, an alkyl peroxide, an acyl peroxide, a diazonium compound, or an alkyl hydroperoxide.

12. The composition of claim 11 wherein said initiator is present in an amount of about 2 to 7%, based on the weight of the non-volatile content of the composition.

13. The composition of claim 7 wherein for component (a), n is 30 to 250.

14. The composition of claim 7 wherein for component (a), R$^3$ is a straight chain or branched alkyl moiety of 2 to 4 carbon atoms substituted with 1 to 2 thiol groups, and each of R$^4$ and R$^5$ is, independently, a straight chain or branched alkyl moiety of 1 to 4 carbon atoms optionally substituted with 1 to 2 thiol groups, or a straight chain or branched alkoxy group of 1 to 20 carbon atoms.

15. The composition of claim 7 wherein for component (a), R$^3$ is substituted with one thiol group and each of R$^4$ and R$^5$ is not substituted with a thiol group.

16. The composition of claim 7 wherein for component (a), R$^1$ is (3-mercaptopropyl)dimethoxysilyl, (3-mercaptopropyl)dimethylsilyl, (3-mercaptopropyl)methoxymethylsily, (3-mercaptopropyl)ethoxymethylsilyl, or (3-mercaptopropyl)diethoxysilyl.

17. The composition of claim 7 wherein for component (a), the percentage by weight of the R$^1$ moiety incorporated into the cellulose ester is about 10–50%, based on the weight of the grafted cellulose ester.

18. The composition of claim 7 wherein said solvent is acetone, 2-butanone, 2-pentanone, ethyl acetate, propyl acetate, propyl ether, tetrahydrofuran, methylene chloride, chlorobenzene, or dichlorobenzene.

19. The composition of claim 7 containing up to 1% of at least one additional additive selected from a biocide, a leveling agent and an antifoamant.

20. The composition of claim 10 containing up to 1% of at least one additional additive selected from a biocide, a leveling agent and an antifoamant.

21. An article comprising
(A) a substrate, and
(B) a cured coating composition comprising:
(a) about 1 to 90 weight percent (based on the weight of (B) (a) plus (B) (b)) of a grafted cellulose ester of the formula

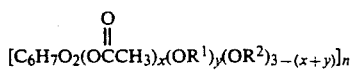

wherein
$R^1$ is a silicon moiety of the formula

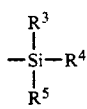

$R^2$ is, independently, —H, —COCH$_3$, —COC$_2$H$_5$, or —COC$_3$H$_7$, $R^3$ is a straight chain or branched alkyl moiety of 2 to 20 carbon atoms substituted with at least one thiol group, $R^4$ is a straight chain or branched alkyl moiety of 1 to 20 carbon atoms optionally substituted with at least one thiol group, or a straight chain or branched alkoxy moiety of 1 to 20 carbon atoms, $R^5$, independently, has the same meaning as $R^4$, x is about 0.1 to 2.9, y is about 0.1 to 2.0, and n is at least 30, provided that (x+y) is in the range of 2.0 to 3.0, (b) about 10 to 99 weight percent (based on the weight of (B) (a) plus (B) (b)) of a monomer, oligomer, polymer, or mixture thereof which contains polymerizable ethylenically unsaturated groups, and (c) a solvent or mixture of solvents in an amount sufficient to solubilize components (a) and (b).

22. The article of claim 21 wherein said substrate is wood, plastic, metal, cardboard, glass, a cellulose ester, polypropylene, a polypropylene/glass combination, polycarbonate, or a polyester.

23. The article of claim 21 wherein said coating has a % acetone insolubles greater than a control coating using an ungrafted cellulose ester and a pencil hardness of greater than or equal to 2H using ASTM Procedure D-3363.

24. A process for preparing a grafted cellulose ester of the formula

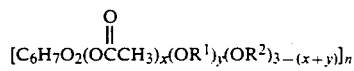

wherein $R^1$ is a silicon moiety of the formula

$R^2$ is, independently, —H, —COCH$_3$, —COC$_2$H$_5$, or —COC$_3$H$_7$, $R^3$ is a straight chain or branched alkyl moiety of 2 to 20 carbon atoms substituted with at least one thiol group, $R^4$ is a straight chain or branched alkyl moiety of 1 to 20 carbon atoms optionally substituted with at least one thiol group, or a straight chain or branched alkoxy moiety of 1 to 20 carbon atoms, $R^5$, independently, has the same meaning as $R^4$, x is about 0.1 to 2.9, y is about 0.1 to 2.0, and n is at least 30, provided that (x+y) is in the range of 0.2 to 3.0, comprising contacting (a) an ester of cellulose and at least one saturated monocarboxylic acid having 2 to 4 carbon atoms, wherein said cellulose ester has a degree of substitution per anhydroglucose unit of residual hydroxyl groups of about 0.1 to 2.0, and (b) a component of the formula

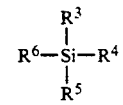

wherein $R^3$, $R^4$, and $R^5$ are as defined hereinabove, and $R^6$ is halogen or straight chain or branched alkoxy moiety of 1 to 20 carbon atoms, in the presence of a solvent and a catalytic amount of a catalyst.

25. The process of claim 24 carried out at a temperature between about 25° C. to 175° C.

26. The process of claim 24 wherein said cellulose ester has a degree of substitution per anhydroglucose unit of residual hydroxyl groups of about 0.3 to 0.9.

27. The process of claim 24 wherein said solvent is acetone, 2-butanone, ethyl acetate, 2-pentanone, butyl acetate, propyl acetate, chlorobenzene, or toluene.

28. The process of claim 24 wherein compound (b) is selected from the group consisting of (3-mercaptopropyl)trimethoxysilane, (3-mercaptopropyl)dimethylmethoxysilane, (3-mercaptopropyl)dimethoxymethylsilane, (3-mercaptopropyl)dimethylchlorosilane, (3-mercaptopropyl)dimethylethoxysilane, (3-mercaptopropyl)-diethoxymethylsilane, and (3-mercaptopropyl)-triethoxy-silane.

29. The process of claim 24 wherein said catalytic amount of catalyst is about 0.1 to about 1 weight percent, based on the weight of the cellulose ester.

30. The process of claim 24 wherein said catalyst is selected from the group consisting of a dialkyltin diester, a tetraalkoxy titanate, and a dialkylzinc compound.

31. A process for curing a coating composition comprising:
(a) about 1 to 90 weight percent (based on the weight of (a) plus (b)) of a grafted cellulose ester of the formula

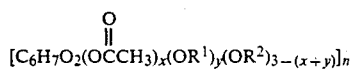

wherein
R$^1$ is a silicon moiety of the formula

R$^2$ is, independently, —H, —COCH$_3$, —COC$_2$H$_5$, or —COC$_3$H$_7$,
R$^3$ is a straight chain or branched alkyl moiety of 2 to 20 carbon atoms substituted with at least one thiol group,
R$^4$ is a straight chain or branched alkyl moiety of 1 to 20 carbon atoms optionally substituted with at least one thiol group, or a straight chain or branched alkoxy moiety of 1 to 20 carbon atoms,
R$^5$, independently, has the same meaning as R$^4$,
x is about 0.1 to 2.9,
y is about 0.1 to 2.0, and
n is at least 30,
provided that (x+y) is in the range of 0.2 to 3.0,
(b) about 10 to 99 weight percent (based on the weight of (a) plus (b)) of a monomer, oligomer, polymer or mixture thereof which contains polymerizable ethylenically unsaturated groups,
(c) a solvent or mixture of solvents in an amount sufficient to solubilize components (a) and (b), and
(d) up to 7 weight percent (based on the total weight of the coating composition) of at least one initiator, said process comprising subjecting said coating composition to heat or light under conditions such that the polymerizable ethylenically unsaturated groups of component (b) become substantially polymerized.

32. The process of claim 31 wherein said initiator is an acetophenone/tertiary amine combination, a benzophenone/tertiary amine combination, an organic peroxide, benzoin, an ether of benzoin, a benzil ether, a hydrogen peroxide/ferrous ion combination, an alkyl peroxide, an acyl peroxide, a diazonium compound, or an alkyl hydroperoxide.

33. A process for facilitating isolating a grafted cellulose ester of the formula

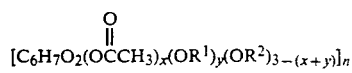

wherein
R$^1$ is a silicon moiety of the formula

R$^2$ is, independently, —H, —COCH$_3$, —COC$_2$H$_5$, or —COC$_3$H$_7$,
R$^3$ is a straight chain or branched alkyl moiety of 2 to 20 carbon atoms substituted with at least one thiol group,
R$^4$ is a straight chain or branched alkyl moiety of 1 to 20 carbon atoms optionally substituted with at least one thiol group, or a straight chain or branched alkoxy moiety of 1 to 20 carbon atoms,
R$^5$, independently, has the same meaning as R$^4$,
x is about 0.1 to 2.9,
y is about 0.1 to 2.0, and
n is at least 30,
provided that (x+y) is in the range of 0.2 to 3.0, and wherein said grafted cellulose ester is in unprecipitated form and is in a mixture with reaction by-products and a solvent,
comprising: contacting said mixture with an amount of nonsolvent sufficient to precipitate the desired product.

34. The process of claim 33 including the additional step of separating the precipitated product from unprecipitated by-products.

35. The process of claim 34 wherein said non-solvent is selected from the group consisting of water, methanol, ethanol, isopropanol, hexane, heptane and mixtures thereof.

* * * * *

UNITED STATES PATENT AND TRADEMARK OFFICE
CERTIFICATE OF CORRECTION

PATENT NO. : 5,082,914

DATED : January 21, 1992

INVENTOR(S) : Phillip M. Cook and Stephen S. Kelley

It is certified that error appears in the above-identified patent and that said Letters Patent is hereby corrected as shown below:

Column 12, line 63 (Claim 16, line 4), "methoxymethylsily," should be ---methoxymethylsilyl,---.

Column 13, line 44 (Claim 21), "2.0" should be ---0.2---.

Signed and Sealed this

Sixth Day of July, 1993

Attest:

MICHAEL K. KIRK

Attesting Officer     Acting Commissioner of Patents and Trademarks